(12) United States Patent
Peng (10) Patent No.: US 11,655,985 B2
(45) Date of Patent: May 23, 2023

(54) RANGE HOOD WITH HEIGHT ADJUSTABLE SUCTION UNIT

(71) Applicant: Ta-Chun Peng, Taichung (TW)

(72) Inventor: Ta-Chun Peng, Taichung (TW)

( * ) Notice: Subject to any disclaimer, the term of this patent is extended or adjusted under 35 U.S.C. 154(b) by 288 days.

(21) Appl. No.: 17/163,530

(22) Filed: Jan. 31, 2021

(65) Prior Publication Data

US 2022/0243925 A1     Aug. 4, 2022

(51) Int. Cl.
*F24C 15/20*     (2006.01)

(52) U.S. Cl.
CPC ...... *F24C 15/2092* (2013.01); *F24C 15/2021* (2013.01)

(58) Field of Classification Search
CPC .......................... F24C 15/2092; F24C 15/2085
USPC .............. 126/299 R, 300, 301, 299 D, 299 F
See application file for complete search history.

(56) References Cited

U.S. PATENT DOCUMENTS

| | | | | |
|---|---|---|---|---|
| 2016/0069580 | A1* | 3/2016 | Crisa' | F24F 11/66 |
| | | | | 454/343 |
| 2016/0123603 | A1* | 5/2016 | Chen | F24C 15/2064 |
| | | | | 126/299 D |
| 2018/0038600 | A1* | 2/2018 | Amiri | F24C 15/2092 |
| 2018/0313546 | A1* | 11/2018 | Kim | F24C 15/2092 |
| 2020/0278119 | A1* | 9/2020 | Kenny | F24C 15/2092 |

FOREIGN PATENT DOCUMENTS

| | | | | | |
|---|---|---|---|---|---|
| CN | 106839033 | A | * | 6/2017 | |
| CN | 107339725 | A | * | 11/2017 | |
| CN | 109099477 | A | * | 12/2018 | .......... F24C 15/2085 |
| CN | 109237559 | A | * | 1/2019 | .......... F24C 15/2021 |
| CN | 111006282 | A | * | 4/2020 | .............. F24C 15/20 |
| CN | 111156561 | A | * | 5/2020 | |
| CN | 111306592 | A | * | 6/2020 | .............. F24C 15/20 |
| CN | 111594894 | A | * | 8/2020 | .............. F24C 15/20 |
| CN | 111706894 | A | * | 9/2020 | .......... F24C 15/2021 |
| CN | 111735086 | A | * | 10/2020 | .......... F24C 15/2085 |
| CN | 112113260 | A | * | 12/2020 | |
| CN | 112161310 | A | * | 1/2021 | .......... F24C 15/2021 |
| DE | 102016219717 | A1 | * | 4/2018 | .......... F24C 15/2085 |
| JP | 2002357350 | A | * | 12/2002 | |
| JP | 2002372275 | A | * | 12/2002 | .......... F24C 15/2085 |
| JP | 2008002707 | A | * | 1/2008 | .......... F24C 15/2085 |
| JP | 2008267736 | A | * | 11/2008 | .......... F24C 15/2085 |
| KR | 100612464 | B1 | * | 8/2006 | |
| KR | 20090001879 | U | * | 2/2009 | |
| WO | WO-2018120259 | A1 | * | 7/2018 | ................ B66F 7/28 |

* cited by examiner

*Primary Examiner* — Ko-Wei Lin (57) ABSTRACT

A range hood includes a body having a space formed therein, and multiple grooves are formed in the inside of the space. The body includes an opening in the underside thereof. The opening communicates with the space. A case includes multiple rails which are slidably located in the grooves. A frame is located in the space and includes a blower. A driving unit is located in the space and connected to the case so as to lift and lower the case by moving the rails along the grooves.

5 Claims, 11 Drawing Sheets

RANGE HOOD WITH HEIGHT ADJUSTABLE SUCTION UNIT

BACKGROUND OF THE INVENTION

1. Fields of the Invention

The present invention relates to a kitchen range hood, and more particularly, to a movable case slidably connected to the range hood so as to smoothly adjust the height of the blower relative to the stove.

2. Descriptions of Related Art

Range hoods are an important device for kitchens. For the current hoods, the distance between the exhaust position and the stove is fixed, so that the suction power of the hood cannot be effectively exerted.

In addition, the conventional range hoods are not well adapted to all cooking types in terms of sucking the smoke and grease particles. Adjustable range hoods have been introduced to the market, such as Taiwanese Patent No. M604382 "Extractors with lifting air ducts." However, this case is driven by a rack cooperated with gears, so that the lifting air duct can move upward and downward to adjust its suction position. Nevertheless, this structure has an inherent shortcoming, that is the structure composed of the rack and the gears, which easily makes the air duct be tilt during movement, thereby affecting the smoothness of movement.

The present invention intends to provide arrange hood with a eight adjustable case that adjusts the height of the blower and the stove.

SUMMARY OF HE INVENTION

The present invention relates to a range hood and comprises a body having a space, and multiple grooves are formed in the inside of the space. The body includes an opening formed in the underside thereof, and the opening communicates with the space. A control panel is connected to the body. A case includes multiple rails which are slidably located in the grooves. A portion of the case adjustably protrudes beyond the underside of the body via the opening. The case includes a suction path formed therein. A slot is formed in the underside of the case and communicates with the suction path. A driving unit is located in the space and connected to the case. The driving unit is electrically connected to the control panel, A frame is located in the space and includes a blower which is electrically connected to the control panel so as to suck smoke via the suction path.

The primary object of the present invention is to provide a range hood wherein the case is adjusted relative to the stove so as to provide proper suction force to meet needs of different cooking styles. The case is moved smoothly by moving rails of the case along the grooves of the space of the body.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 7, the range hood of the present invention comprises a body 1 having a space 11 formed therein, and multiple grooves 12 are formed in the inside of the space 11. The body 1 includes an opening 13 formed in the underside thereof, and the opening 13 communicates with the space 11. A control panel 2 is connected to the body 1 so that users can operate the control panel to control the range hood. A case 3 includes multiple rails 31 which are slidably located in the grooves 12. A portion of the case 3 can adjustably protrude beyond the underside of the body 1 via the opening 13. The case 3 has a suction path 32 formed therein. Multiple slots 33 are formed in the underside of the case 3 and communicate with the suction path 32. A driving unit 4 is located in the space 11 and connected to the case 3. The driving unit 4 is electrically connected to the control panel 2. A frame 5 is located in the space 11 and includes a blower 6 or a fan which is electrically connected to the control panel 2 so as to suck smoke and grease particles via the suction path 32.

Figure 1:
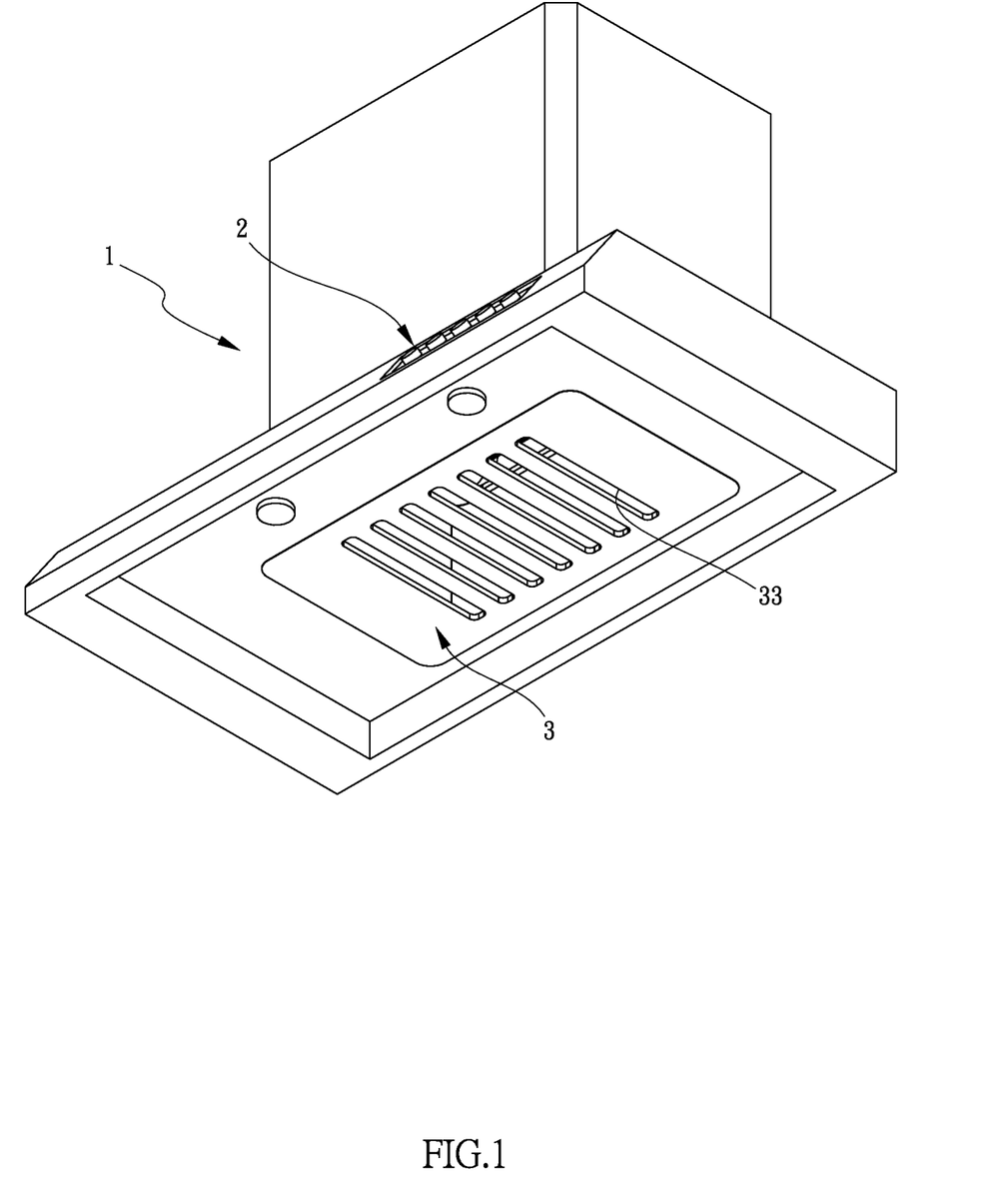
FIG. 1 is a perspective view to show the range hood of the present invention.
Figure 2:
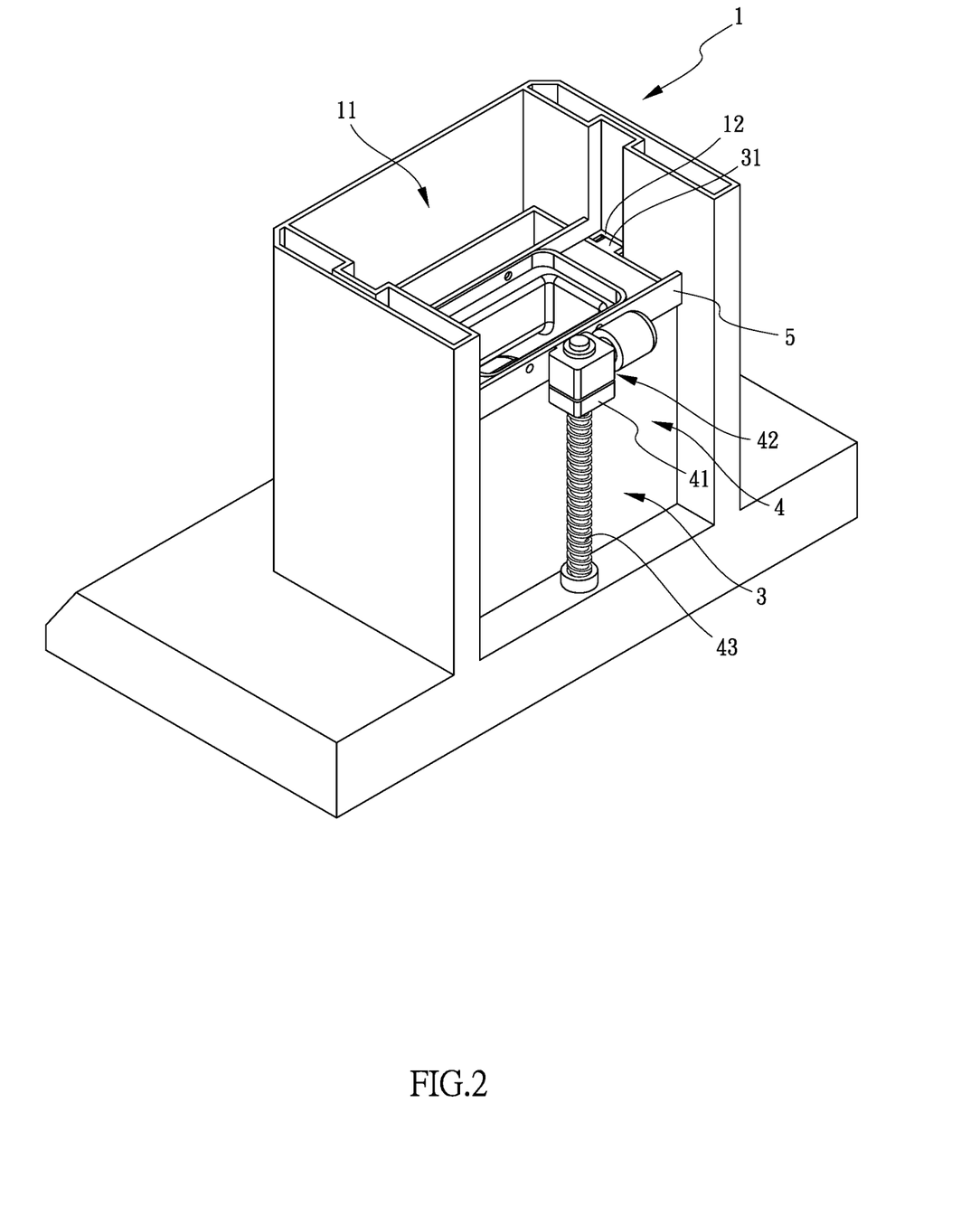
FIG. 2 is another perspective view to show the range hood of the present invention.
Figure 3:
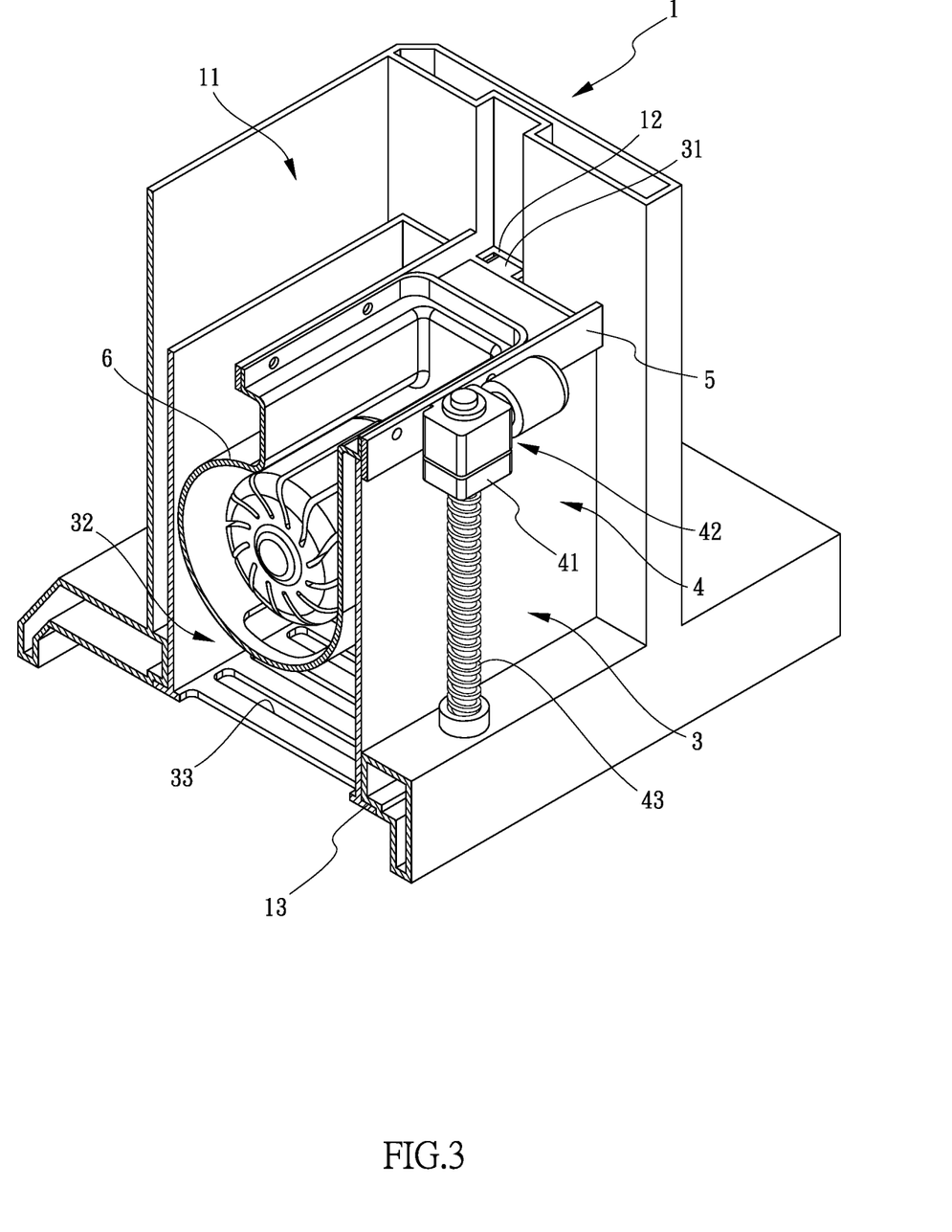
FIG. 3 is a partial cross sectional view to show the blower located in the case of the range hood of the present invention.
Figure 4:
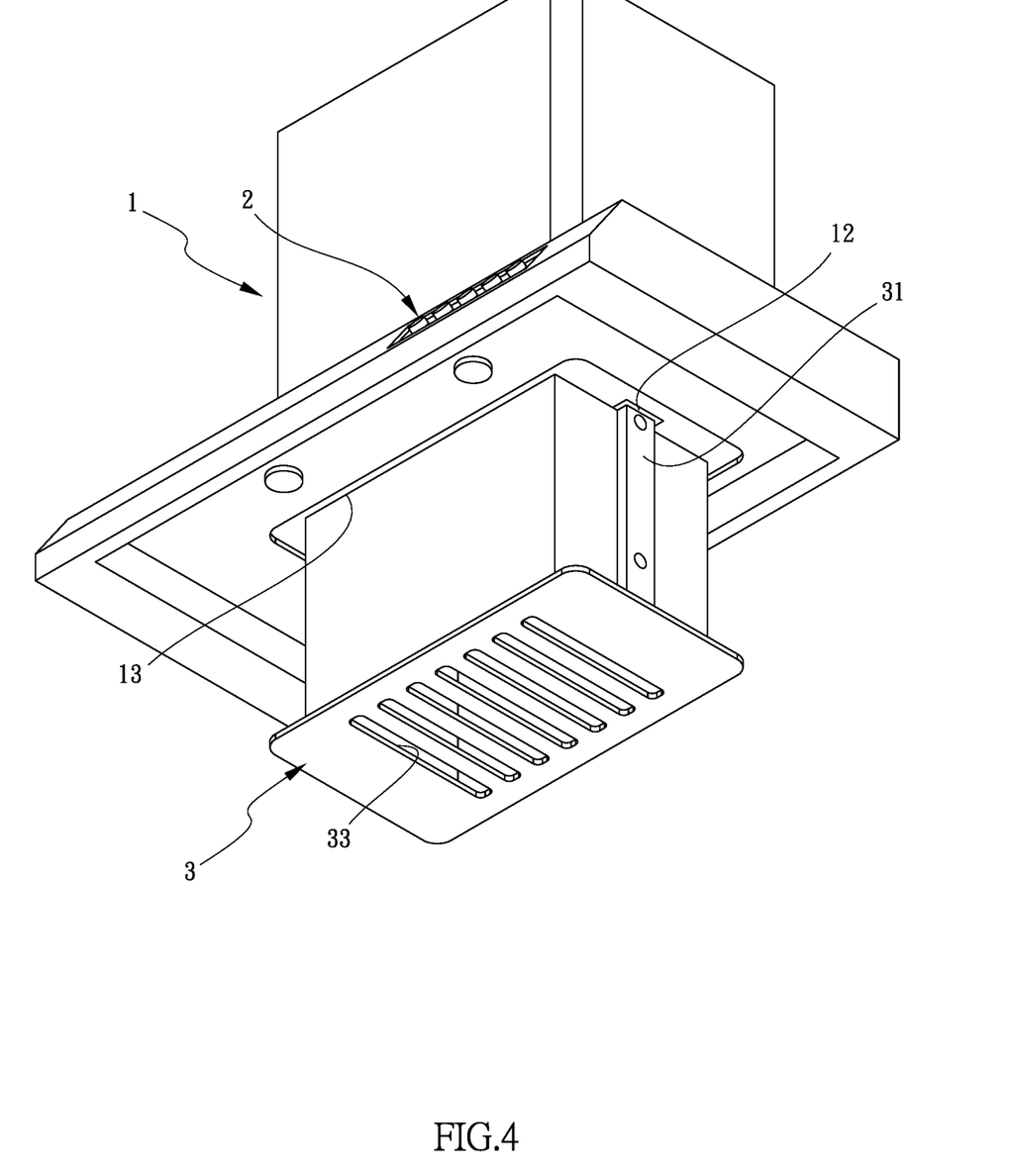
FIG. 4 is a perspective view to show that the case is lowered beyond the body.
Figure 5:
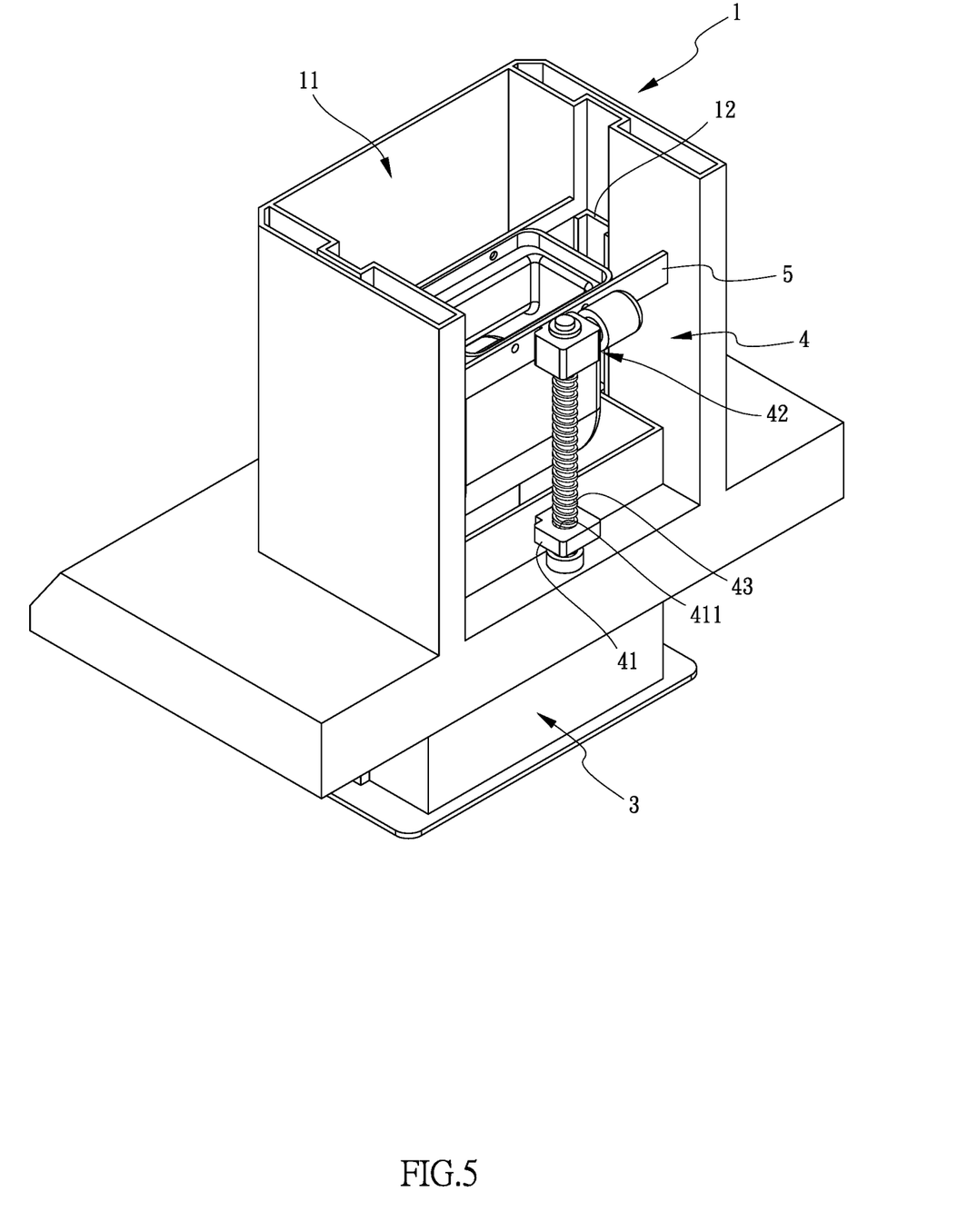
FIG. 5 is another perspective view to show that the case is lowered beyond the body.
Figure 6:
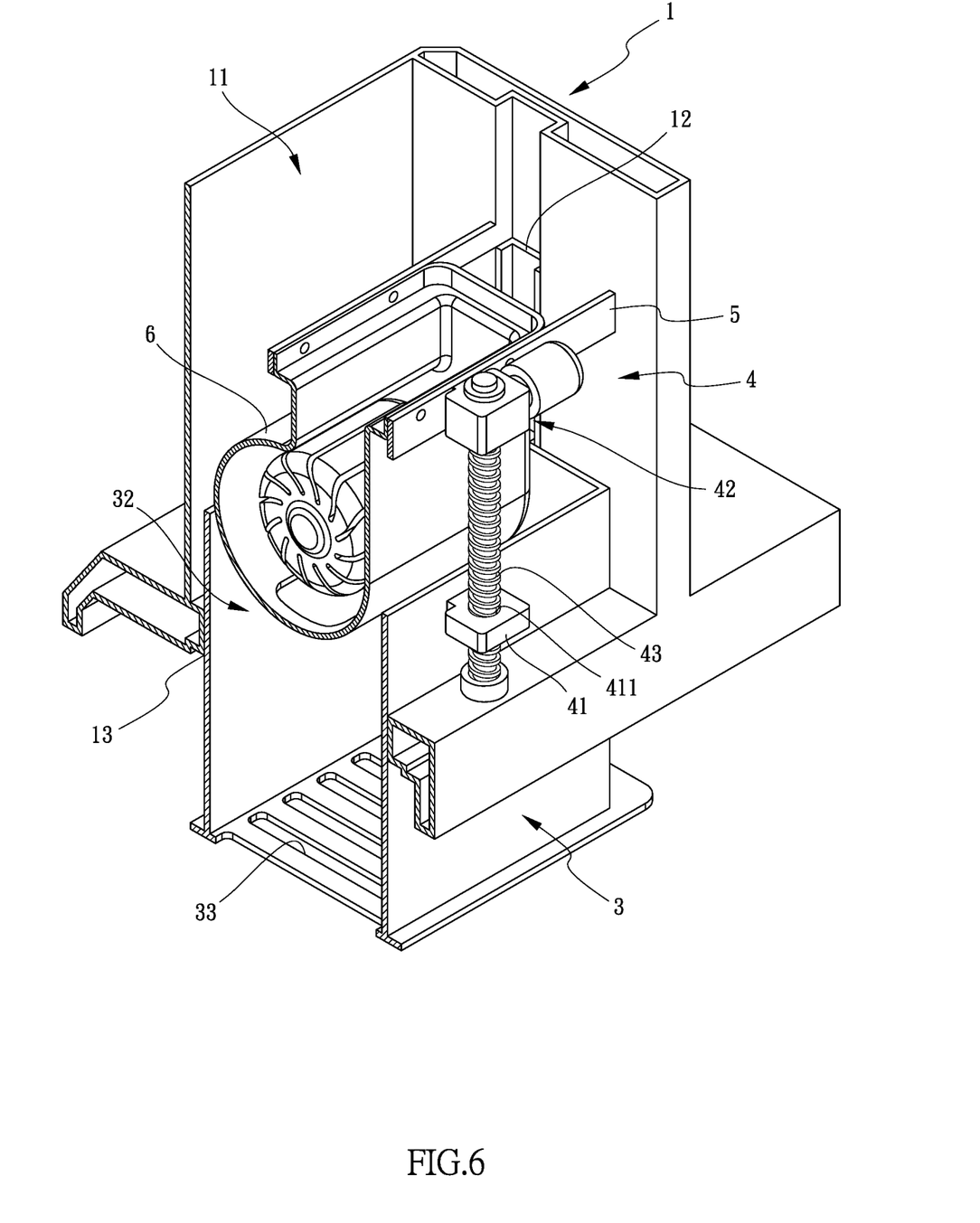
FIG. 6 is a partial cross sectional view show that the case is lowered beyond the body.
Figure 7:
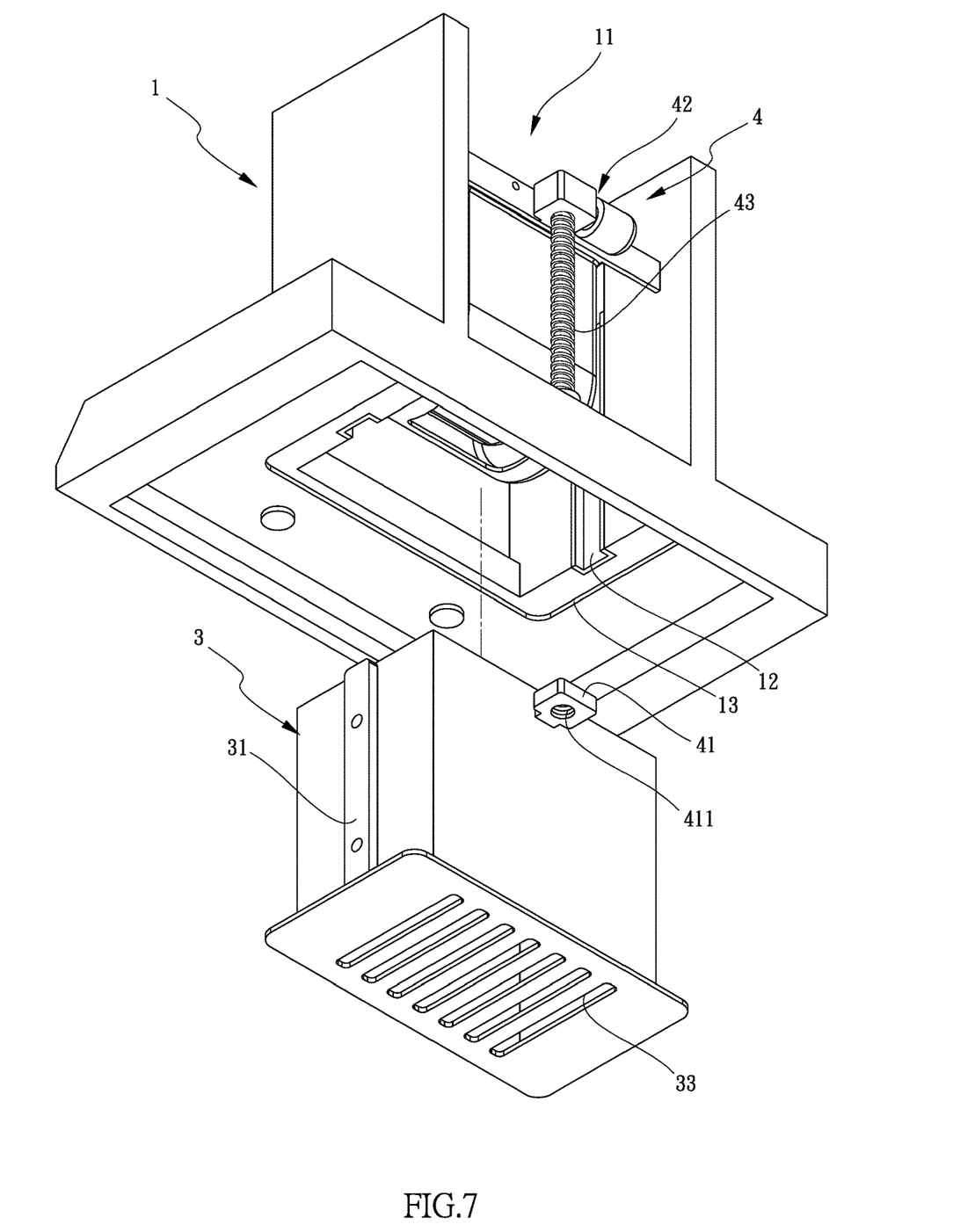
FIG. 7 is an exploded view of the range hood of the present invention.

As shown in FIGS. 1 to 3, when the users want to lower the position of opening 33, the user operate on the control panel 2 to activate the driving unit 4 so as to lower the position of the opening 33 as shown in FIGS. 4 to 6. When the users want to raise the position of opening 33, the user operate on the control panel 2 to activate the driving unit 4 so as to raise the position of the opening 33. The blower 6 is then activated by operating the control panel 2, such that the smoke which passes through the opening 33 and enters into the suction path 32, and is sent out from the range hood by the blower 6. Alternatively, the case 3 can be lifted or lowered while the blower 6 is in action. The rails 31 slide along the groove 12 to smoothly move the case 3 which moves stably and is not tilt.

The present invention is able to adjust the height of the opening 33 relative to the stove so as to efficiently suck the smoke during cooking. The cooperation between the rails 31 and the groove 12 makes movement of the case smoothly.

The driving unit 4 includes a block 41, a driving member 42 and a threaded rod 43. The driving member 42 is located in the space 11 and connected to the frame 5. The threaded rod 43 is connected to the driving member 42. The block 41 includes a threaded hole 411, and the threaded rod 43 is threadedly and rotatably engaged with the threaded hole 411. The block 41 is connected to the case 3. When the users operate the control panel 2, the driving member 42 is activated to drive the threaded rod 43 clockwise or counter clockwise so as to move the block 41 upward or downward. The case 31 that is connected to the block 41 is then moved.

Figure 8:
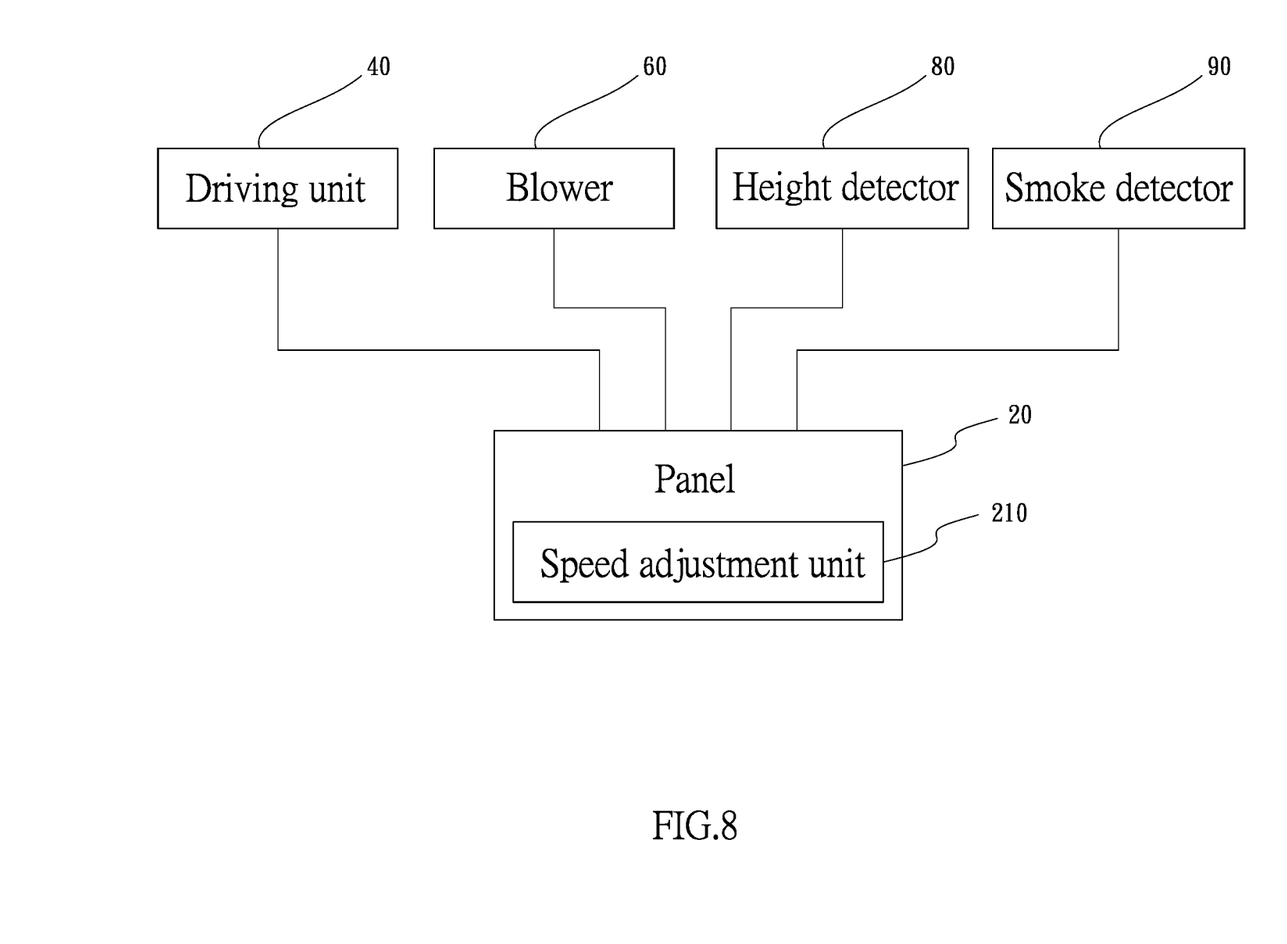
FIG. 8 illustrates components that are electrically connected to the control panel of the range hood of the present invention.
Figure 9:
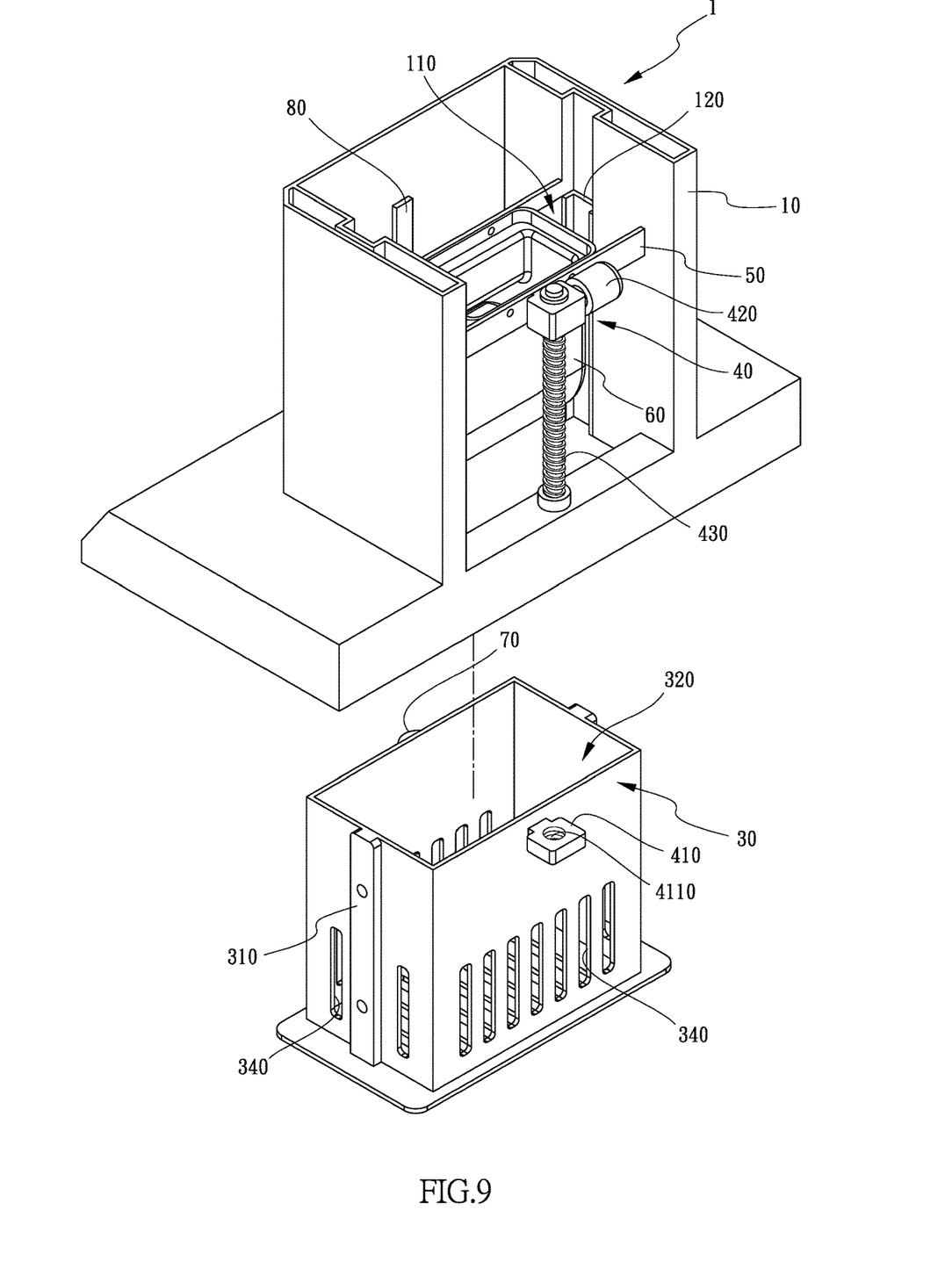
FIG. 9 is an exploded view of another embodiment of the range hood of the present invention.

As shown in FIGS. 8 and 9, another embodiment is disclosed, wherein the range hood comprises a body 10 having a space 110 formed therein. Multiple grooves 120 are formed in the inside of the space 110. The body 10 includes an opening 130 formed in the underside thereof, and the opening 130 communicates with the space 110. A control panel 20 is connected to the body 1 and includes a speed adjustment unit 210 which is used to adjust the speed of the blower 60. A case 30 has multiple rails 310 which are slidably located in the grooves 120. A portion of the case 30 is able to adjustably protrude beyond the underside of the body 10 via the opening 130. The case 30 has a suction path 320 formed therein. Multiple slots 330 are formed in the underside of the case 30 and communicate with the suction path 320. A driving unit 40 is located in the space 110 and connected to the case 30. The driving unit 40 is electrically connected to the control panel 20. A frame 50 is located in the space 110 and includes a blower 60 or a fan. The blower 60 is electrically connected to the control panel 20 so as to suck smoke via the suction path 320. A label 70 is connected to the case 30. A height detector 80 is located in the space 110 and is able to detect the label 70. The height detector 80 is electrically connected to the control panel 20. The speed adjustment unit 210 is responsive to the detected signal of the height detector 80 and then adjusts the speed of the blower 60.

Figure 10:
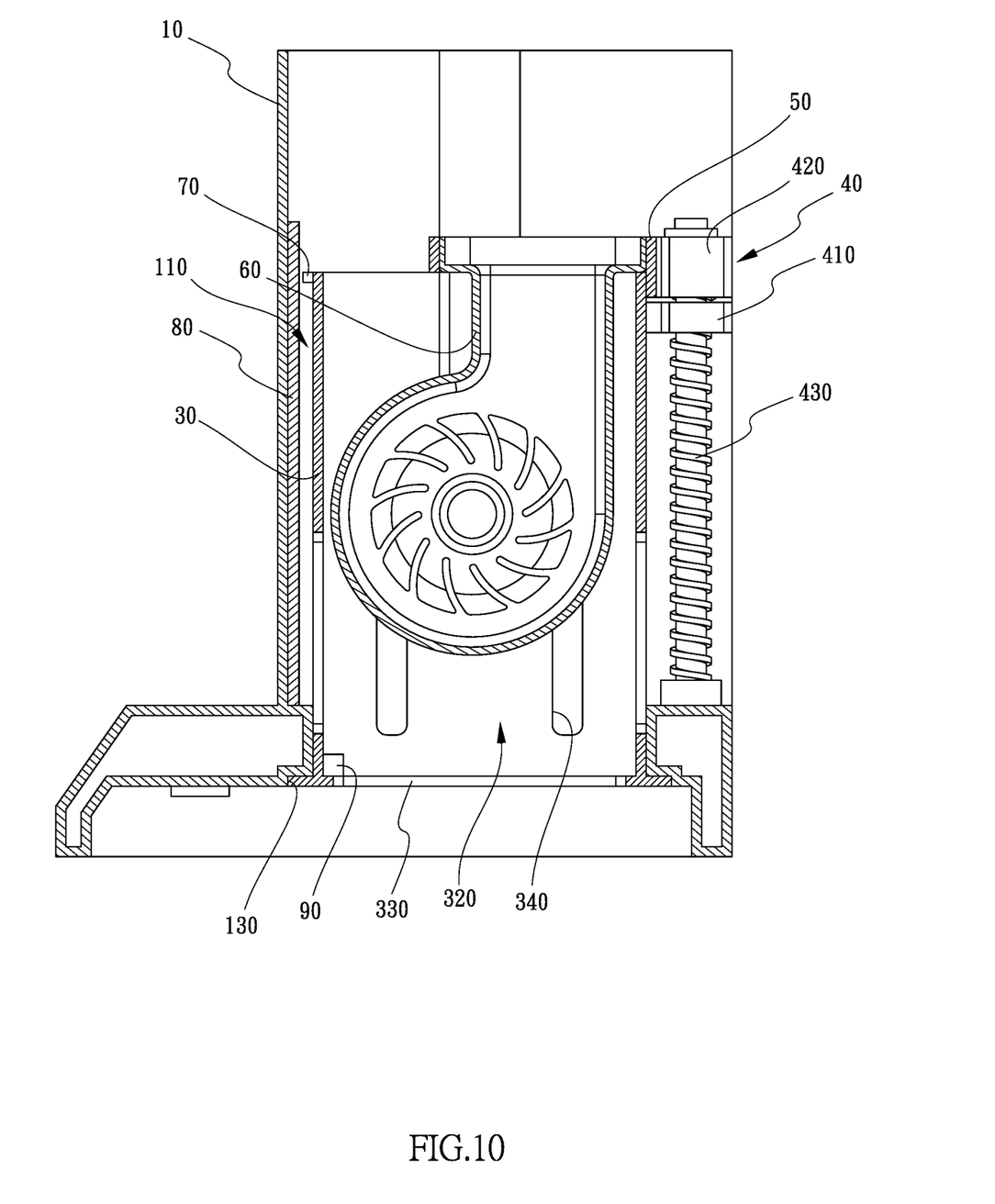
FIG. 10 shows that the height detector detects the sensor at one position of range hood of the present invention.
Figure 11:
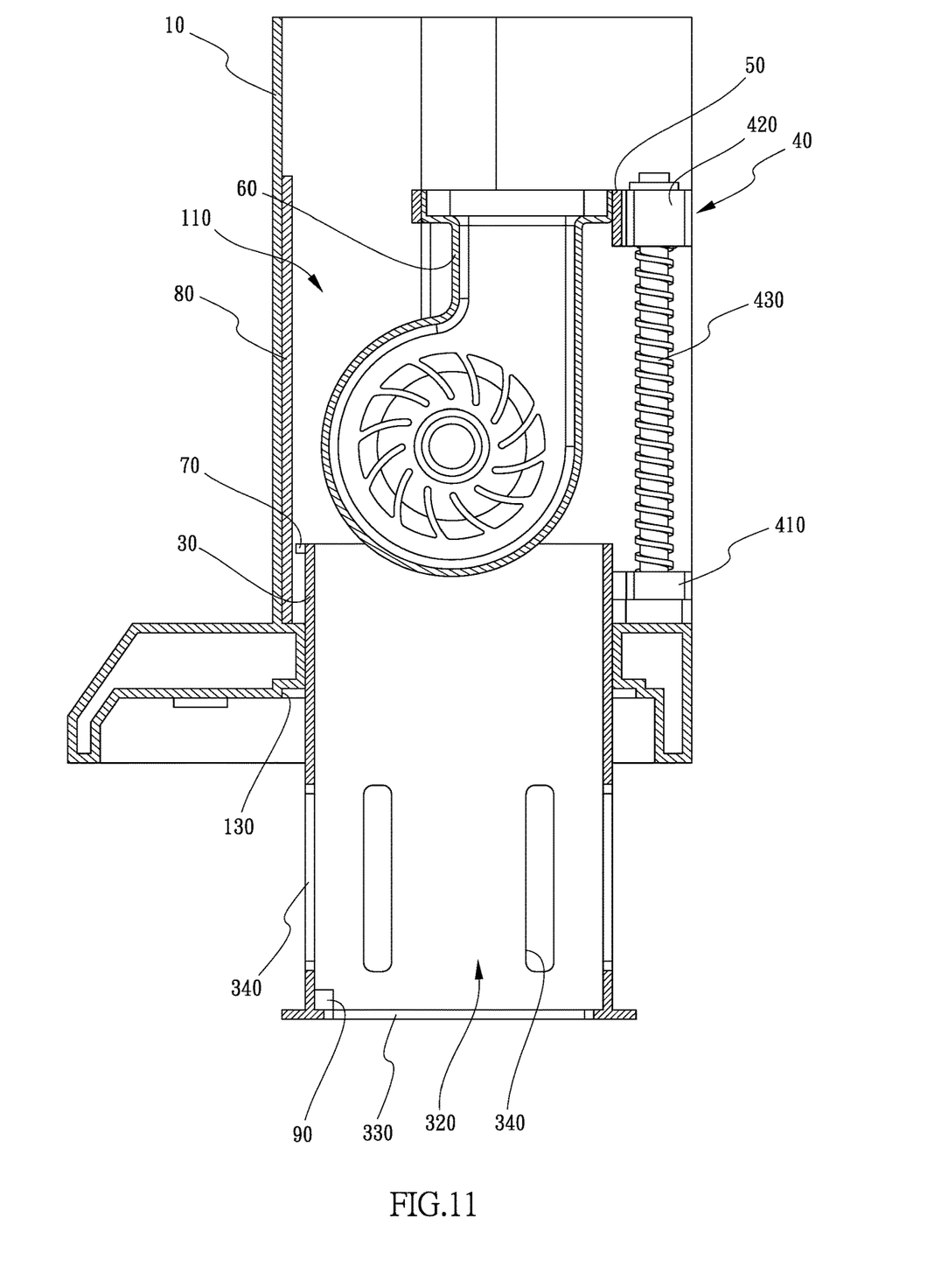
FIG. 11 shows that the height detector detects the sensor at another position of the range hood of the present invention.

As shown in FIGS. 10 and 11, this embodiment adds the feature of automatically adjustment of the speed of the blower 60 by the use the sensor 70, the height detector 80 and the speed adjustment unit 210. The sensor 70 is connected to the case 30 and moves with the case 30. The height detector 80 detects the sensor 70 to decide the position of the case 30. The detected signal of the height detector 80 is then sent to the speed adjustment unit 210 which then adjusts the speed of the blower 60.

As shown in FIGS. 10 and 11, the driving unit 40 includes a block 410, a driving member 420 and a threaded rod 430. The driving member 420 is located in the space 110 and connected to the frame 50. The threaded rod 430 is connected to the driving member 420. The block 410 includes a threaded hole 4110. The threaded rod 430 is threadedly and rotatably engaged with the threaded hole 4110. The block 410 is connected to the case 30.

As shown in FIG. 9, the case 30 includes multiple holes 340 defined through the sidewall thereof. The multiple holes 340 communicate with the suction path 320 so as to increase the suction area.

As shown in FIGS. 8, 10 and 11, a smoke detector 90 is electrically connected to the speed adjustment unit 210 and connected to the case 30. The smoke detector 90 is located close to the slot 330. The speed adjustment unit 210 is responsive to the detected signal of the smoke detector 90 and adjusts the speed of the blower 60. In other words, the speed of the blower 60 is adjusted according to the amount of the smoke to save energy and reduce noise.

Preferably, the area of the underside of the body 10 is three times of the area of the underside of the case 30. The above-mentioned area ratio effectively sucks the smoke so that the case 30 can be made small and light in weight to reduce the operation burden of the driving unit 40.

The speed adjustment unit 210 includes a low speed mode, a mediate speed mode and a high speed mode. When the case 30 is lowered 0 to 7 centimeters from the highest position thereof, the speed adjustment unit 210 sends a signal of the low speed mode to the blower 60. When the case 30 is lowered 7 to 15 centimeters from the highest position thereof, the speed adjustment unit 210 sends a signal of the mediate speed mode to the blower 60. When the case 30 is lowered 1.5 to 25 centimeters from the highest position thereof, the speed adjustment unit 210 sends a signal of the high speed mode to the blower 60. The lower the case 30 is moved, the higher speed the blower 60 operates, and the higher the case 30 is moved, the lower speed the blower 60 operates. The high speed of the blower 60 when the case 30 is sent to a lower position, can suck the smoke quickly. This feature is helpful when in emergency situation, the speed of the blower 60 is automatically switched to high to suck the smoke within a short period of time when the case 30 is sent to a lower position. When the case is set to a higher position, this position means that there is limited smoke generated, so that the speed of the blower 60 is automatically switched to low to save energy and reduce noise.

While we have shown and described the embodiment in accordance with the present invention, it should be clear to those skilled in the art that further embodiments may be made without departing from the scope of the present invention.

What is claimed is:

1. A range hood comprising:
   a body having a space formed therein, multiple grooves formed in the space, the body having an opening formed in an underside thereof, the opening communicating with the space;
   a control panel connected to the body and including a speed adjustment unit;
   a case having multiple rails which are slidably located in the grooves, a portion of the case adjustably protruding beyond the underside of the body via the opening, the case having a suction path formed therein, a slot formed in an underside of the case and communicating with the suction path;
   a driving unit located in the space and connected to the case, the driving unit electrically connected to the control panel, and
   a frame located in the space and including a blower, the blower electrically connected to the control panel and adapted to suck smoke via the suction path, the speed adjustment unit including a low speed mode, a mediate speed mode and a high speed mode, when the case is lowered 0 to 7 centimeters from a highest position thereof, the speed adjustment unit sends a signal of the low speed mode to the blower, when the case is lowered 7 to 15 centimeters from the highest position thereof, the speed adjustment unit sends a signal of the mediate speed mode to the blower, when the case is lowered 15 to 25 centimeters from the highest position thereof, the speed adjustment unit sends a signal of the high speed mode to the blower;
   a sensor connected to the case, and
   a height detector located in the space, the height detector electrically connected to the control panel, the speed adjustment unit being responsive to a detected signal of the height detector and adjusting a speed of the blower.

2. The range hood as claimed in claim 1, wherein the driving unit includes a block, a driving member and a threaded rod, the driving member is located in the space and connected to the frame, the threaded rod is connected to the driving member, the block includes a threaded hole, the threaded rod is threadedly and rotatably engaged with the threaded hole, the block is connected to the case.

3. The range hood as claimed in claim 1, wherein the case includes multiple holes defined through a sidewall thereof, the multiple holes communicate with the suction path.

4. The range hood as claimed in claim 1, wherein a smoke detector is electrically connected to the speed adjustment unit and connected to the case, the smoke detector is located close to the slot, the speed adjustment unit is responsive to a detected signal of the smoke detector and adjusts a speed of the blower.

5. The range hood as claimed in claim 1, wherein an area of the underside of the body is three times of an area of the underside of the case.

\* \* \* \* \*